United States Patent [19]

Kirkpatrick et al.

[11] Patent Number: 4,870,757
[45] Date of Patent: Oct. 3, 1989

[54] DRYWALL CUTTING TOOL

[76] Inventors: Hugh J. Kirkpatrick, 505 May Dr., Madison, Tenn. 37115; Thomas J. Lee; James M. Lee, both of 403 Goldie Ct., Goodlettsville, Tenn. 37072

[21] Appl. No.: 215,347

[22] Filed: Jul. 5, 1988

[51] Int. Cl.⁴ .............................................. B25G 3/00
[52] U.S. Cl. ...................................... 30/344; 30/329; 16/110 R
[58] Field of Search ................. 30/344, 329, 169, 340, 30/341; 16/110 R

[56] References Cited

U.S. PATENT DOCUMENTS 2,685,734  8/1954  Klein ...................................... 30/344
3,453,651  7/1969  Wentepny, Sr. ...................... 30/344
4,524,514  6/1985  Mallalien et al. ................. 30/344 X Primary Examiner—Frank T. Yost
Assistant Examiner—Willmon Fridie, Jr.
Attorney, Agent, or Firm—Mason, Fenwick & Lawrence

[57] ABSTRACT

A drywall cutting tool having an elongated handle portion and an elongated blade portion, the handle portion being of cylindrical configuration over most of its length and having a tapered end and a rounded edge, and a closed loop finger guard projecting laterally from the tapered end portion of the handle. The blade portion has an inner end captured in the handle and a pointed tip, and is of substantially uniform width and thickness along its length. The tip end has a pair of inclined sharpened edges converging to form a point, and the blade has a sharpened upper longitudinal blade edge along a portion of its length and a lower longitudinal edge of the blade formed with a row of saw teeth along its entire length.

4 Claims, 1 Drawing Sheet

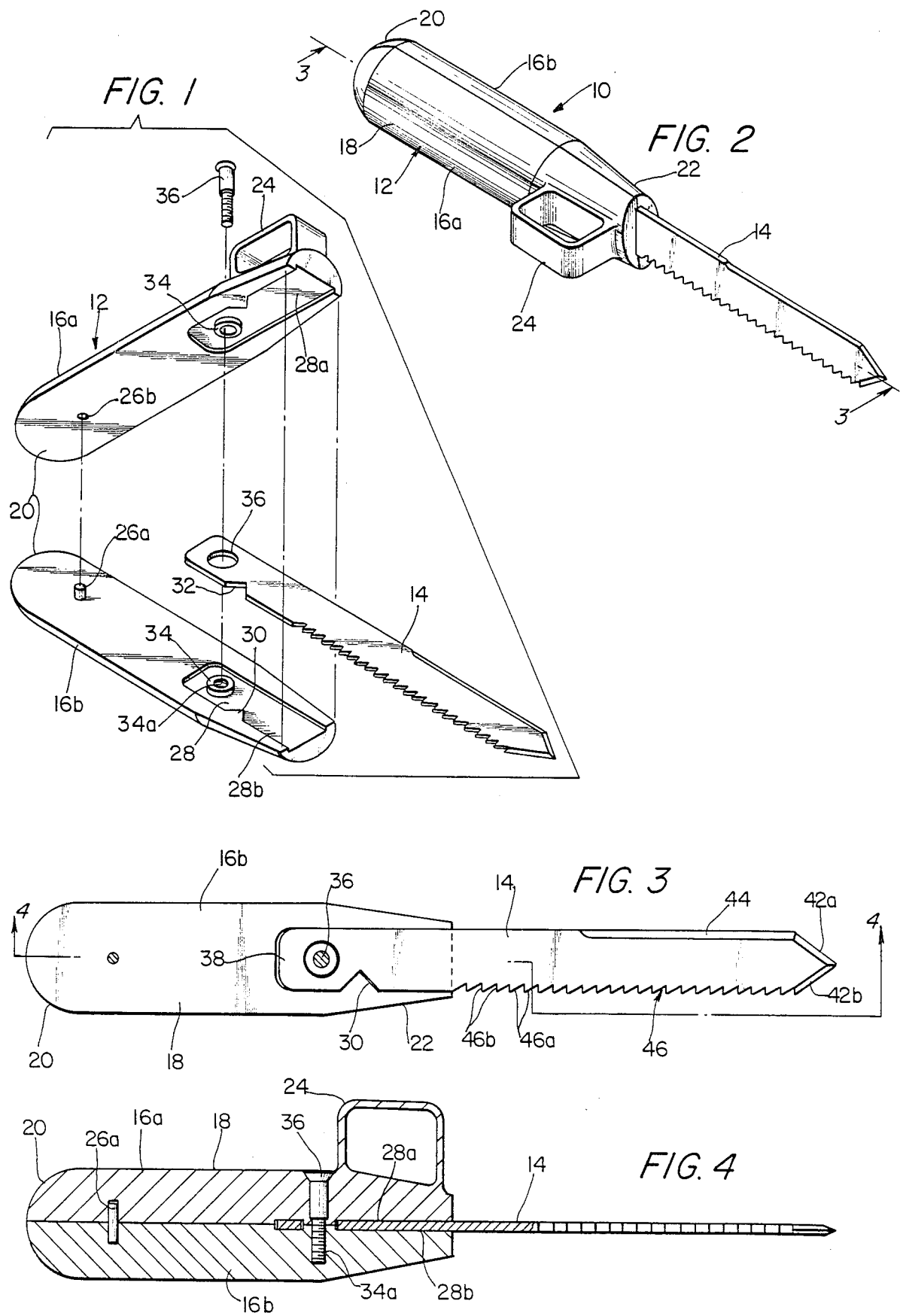

DRYWALL CUTTING TOOL

BACKGROUND AND OBJECTS OF THE INVENTION

The present invention relates in general to compound tools capable of cutting and sawing operations, as desired, by the user, and more particularly to a drywall cutting tool having a blade provided with a penetrating pointed tip and having a sharpened cutting edge section along one edge thereof and a sawing edge along the other edge thereof, especially adapted for cutting drywall panels to provide shaped openings therein and trimming of edge portions to desired configurations.

Heretofore, cutting tools customarily used for cutting dry wall panels to desired configurations during installation of the drywall have involved blades which taper from point to handle and are relatively long, and have been found to be subject to frequent bending during use. Also, the length of such customarily used cutting tools for drywalls in such that the user sometimes unintentionally pierces drywall which may be located behind the drywall being cut, thus damaging already installed drywall panels. Furthermore, injury to the user's hand has occurred when the hand unintentionally slips during use of the conventional drywall cutting tools and obtaining sufficiently secure holding grip on the handle without slippage has been difficult to achieve. Additionally, when the blade of such conventional tools becomes dull, it must be withdrawn from service to be sharpened, and if it has already been sharpened a number of times, such that further sharpening would misshapen the blade, it must be discarded.

An object of the present invention is the provision of a novel drywall cutting tool wherein the blade is provided with a sharpened penetrating tip and a sharpened edge along one longitudinal edge of the blade, and is provided with teeth or serrations along the opposite longitudinal edge, to facilitate either cutting or sawing, and wherein a finger guard loop is provided on the handle to assist in pulling the tool while cutting and to minimize slipping of the user's hand during use.

Another object of the present invention is the provision of a drywall cutting tool as described in the immediately preceding paragraph, wherein the blade is a short blade of about 4 inches length protruding from a handle, designed to resist bending during use and prevent the user from piercing drywall which may be located behind the dry wall being cut.

Another object of the present invention is the provision of a drywall cutting tool as described in either of the two immediately preceding paragraphs, wherein the diameter of the handle is larger than conventional drywall cutting tool handles to provide for a better grip, the top of the handle is tapered on both sides to facilitate better griping, and secure gripping is also facilitated by the U-shaped finger guard formed along the handle.

In another object of the present invention, the provision of a novel drywall cutting tool as described in the immediately preceding paragraphs, where in the handle is a two piece handle of separable halves which can be separated to permit removable of an old blade and insertion of the new blade into the original handle.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is an exploded perspective view of a drywall cutting tool embodying the present invention, showing the handle formed of two halves exploded into separated condition and the replaceable blade associated therewith;

FIG. 2 is a perspective view of the drywall cutting tool of the present invention;

FIG. 3 is a side elevational view of the drywall cutting tool, with one of the handle halves removed, viewed along the section plane 3—3 of FIG. 2; and FIG. 4 is a section view thereof taken along a substantially horizontal longitudinal section place through most of the length of the tool, the section plane being indicated by the lines 4—4 of FIG. 3.

DETAILED DESCRIPTION OF A PREFERRED EMBODIMENT

Referring to the drawings, wherein like reference characters designate corresponding parts throughout the several figures, the drywall cutting tool of the present invention is indicated generally by the reference character 10, and comprises a sectional handle portion 12 and a blade portion 14. The handle portion 12 is formed of two handle halves 16a and 16b, which may be of molded plastic, for example, having a cylindrical portion 18 over much of its length, terminating in a rounded rear end as indicated at 20 and a tapered forward end as indicated at 22. One of the sections, for example section 16a, also includes a loop shaped finger guard 24, for example cast from the same material as the handle section 16a, through which at least one finger of the user's hand, particularly for the purpose of assisting in pulling the tool while cutting and preventing the user's hand from slipping and causing injury. Also, the finger guard, in conjunction with the tapering of the portion 22 of the handle, and the larger diameter of the handle, which is, in one preferred embodiment, about 1 and ¼ inches in diameter in the cylindrical portion, all coact to provide for a better grip.

As is best shown in FIG. 1, the handle sections also include a protruding cylindrical stud pin, for example as shown at 26a to extend into a socket 26b in the opposite handle section, to assist alignment, and an elongated cavity or well 28 is provided to receive the blade 14, formed for example by identical cavity sections 28a and handle section 16a, and cavity section 28b and handle section 16b. Each have a triangular nose formation 30 to register with a triangular recess 32 in the rearmost portion of the blade 14, and each having an annular boss formation 34 having an appropriate outer diameter to be received in the circular hole 36 of the blade near the rearmost end thereof. The annular boss 34 of the handle section 16b is provided with a threaded socket 34a to receive the threaded portion of a fastening screw 36, and the handle section 16a has a hole therethrough concentric with the center of the boss 34 in the cavity section 28a to receive the shank portion of the threaded fastener screw 36 to releasably fasten the two handle sections together.

In the preferred embodiment, the blade 14 is made of stainless galvanized steel and is of the same width from the rear end portion 38 thereof to the pointed tip 40, except for the tapered inclined leading edge portions 42a, 42b forming a point at the outer or tip end 40. The blade, in the preferred example, is 6 and ½ inches long and the cavity or well 28 for receiving the rear end portion 38 of the blade is 2 inches long, so that 4 and ½ inches of the blade protrudes from the tapered end of the handle 12 from which the blade protrudes. In addition to having the sharpened, symmetrically diverging edges 42a, 42b at the free or penetrating tip end of the blade, which extends for ½ inch along the length thereof, the blade also includes a sharpened longitudinal edge 44 for 2 and ½ inches along its upper edge, as viewed in FIG. 3, and includes saw tooth cutting teeth 46 along the lower edge thereof for the full length of the exposed portion of the blade 14. As shown in the drawings, the teeth 46 are saw tooth shaped teeth of right triangular configuration having their included edge 46a included from the point of each tooth toward the sharpened tip end 40 of the blade while the other edge 46b of each tooth, in the position of the knife shown in FIG. 3, is perpendicular to the longitudinal axis of the blade and faces toward the handle. Thus, the teeth provide the best cutting action when the tool is pulled. It is believed that pulling the blade is an easier and more efficient way to cut than having the teeth arranged in such a way that the tool must be pushed to cut.

In one preferred example, the blade has a length of 6 and ½ inches, a width of 11/16th inches, and the teeth 46 are provided in a tooth pattern having 7 teeth per inch over a length of 4 inches, starting at the rearmost end of the inclined cutting edge 42b of the tip 40 of the blade. The handle of the preferred embodiment is approximately 5 inches long, having a diameter of 1 and ¼ inch at the cylindrical portion thereof, the taper extends over 1 and ½ inches adjacent the end of the handle from which the blade 14 penetrates, and the loop shaped finger guard 24 has an inside height of ¾ of an inch at the end thereof nearest the fastener screw 36 and the rearmost leg of the looped shaped finger guard is located about 1 and ¼ inches from the end of the handle from which the blade protrudes.

We claim:

1. A drywall cutting tool having an elongated handle portion and an elongated blade portion arranged serially along a longitudinal axis of the tool, the handle portion being of cylindrical configuration over a major portion of its length and having a tapered first end portion nearest the blade and a rounded end portion at the handle end opposite the blade, a closed loop finger guard projecting laterally from the tapered portion of the handle to receive a finger of the user and facilitate manipulation of the tool, and the blade portion being an elongated thin blade member having an inner end captured in embedded relation in the handle and a pointed tip end at the opposite end of the blade remote from the handle, the blade having substantially uniform width and thickness along its length from the handle to the tip end and the tip end having a pair of inclined sharpened edges converging to form a point, the blade having a first and second spaced longitudinal edges paralleling the longitudinal axis of the tool, the first longitudinal blade edge being sharpened along a portion of its length from a juncture with the inclined sharpened edges forming said pointed tip and the second longitudinal edge of the blade being formed with a row of saw teeth along its entire length, said blade being removably captured in said handle portion, the handle portion being formed in two halves having flat faces to be disposed in abutment with each other in assembled relation, the flat faces of the handle halves having like blade receiving cavities therein shaped to conform to and receive an end portion of the blade therein in tightly nested relation, the blade having a hole in the end portion thereof received in the handle cavities and the handle having a fastener screw extending through a portion of a handle halves and through said hole in the blade, one edge of the end portion of the balde receied in said cavities in said handle halves having a triangular notch therein and said recesses having a triangular nose formation conforming to said notch in the blade end portion to be interfitted therein and assist in retaining the blade in assembled relation in the handle.

2. A drywall cutting tool as defined in claim 1, wherein said inclined sharpened edges at the tip of said blade are inclined at like angles with the longitudinal axis of the tool defining substantially an isosceles triangular shaped pointed tip.

3. A drywall cutting tool as defined in claim 1, wherein said saw teeth are of right triangular configuration having one edge of each tooth inclined from an outermost point of each tooth toward said pointed tip end at similar angles, and the other edge of each tooth extending in a direction perpendicular to the longitudinal axis of the tool.

4. A drywall cutting tool as defined in claim 2, wherein said saw teeth are of right triangular configuration having one edge of each tooth inclined from an outermost point of each tooth toward said pointed tip end at similar angles, and the other edge of each tooth extending in a direction perpendicular to the longitudinal axis of the tool.

* * * * *